United States Patent [19]

Reed

[11] Patent Number: 4,458,586

[45] Date of Patent: Jul. 10, 1984

[54] COMBINATION BREADER, MARINATOR AND PREPARATION UNIT

[76] Inventor: Buckley Reed, 11612 Taylorsville Rd., Jeffersontown, Ky. 40299

[21] Appl. No.: 77,133

[22] Filed: Sep. 19, 1979

[51] Int. Cl.$^3$ .................. A23B 4/00; A23B 4/10; A23G 3/00; A23G 3/26
[52] U.S. Cl. ..................... 99/494; 99/535; 118/19; 118/22; 209/275; 209/401
[58] Field of Search ............... 99/494, 516, 534–536; 118/19, 22, 418, 610, 612; 209/274–277, 401

[56] References Cited

U.S. PATENT DOCUMENTS

| 496,391 | 5/1893 | Bair | 209/275 |
|---|---|---|---|
| 1,739,642 | 12/1929 | Light | 118/19 |
| 2,855,893 | 10/1958 | Greer et al. | 118/22 |
| 3,095,326 | 6/1963 | Green et al. | 118/19 |
| 3,381,658 | 5/1968 | Porambo | 118/19 |
| 3,696,778 | 10/1972 | Moore | 366/154 |
| 4,124,498 | 11/1978 | Russell | 209/275 |
| 4,182,260 | 1/1980 | Reece | 118/22 |

Primary Examiner—Timothy F. Simone
Attorney, Agent, or Firm—Leonard Bloom

[57] ABSTRACT

Disclosed herein is a device to aid in the preparation of foodstuffs that combines the functions of a breader, a marinator and a preparation unit in a single apparatus. This device is comprised of a tiltable mixing head supported by a mobile service cart disposed with a variety of catch basins depending upon the function being performed by the device. The mixing head itself, comprising a sealed mixing drum with a removable lid, agitator blades contained therein, and a motor to drive the blades, is pivotally supported above and attached to the service cart so that foodstuffs contained within the drum may be deposited in a catch pan centrally located on the surface of the service cart by tilting the mixing head downwardly and removing the lid so that the foodstuffs slide into the catch pan when the present device functions as a breader, the upper catch basin is comprised of an upper catch pan with a large rack or grate in the bottom thereof, which retains the foodstuffs while allowing the excess breading material to fall into the catch basin, and underneath the rack, a basin to catch the excess breading material that tumbles therein. The same upper catch pan with a rack in the bottom is used to catch the foodstuffs deposited from the mixing drum, but a different catch basin, provided with a drainage hose, is used to collect the liquid that spills from the mixing drum along with the foodstuffs. Thus the present invention has the capability to perform three separate functions which in the past have often required three separate machines.

10 Claims, 7 Drawing Figures

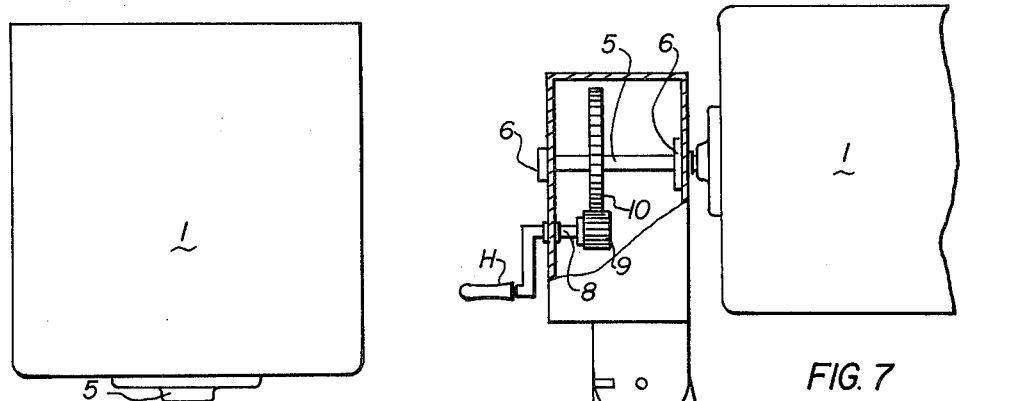
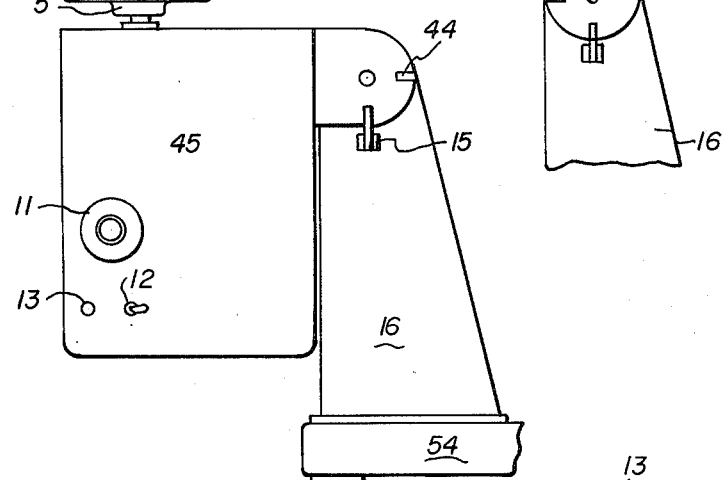
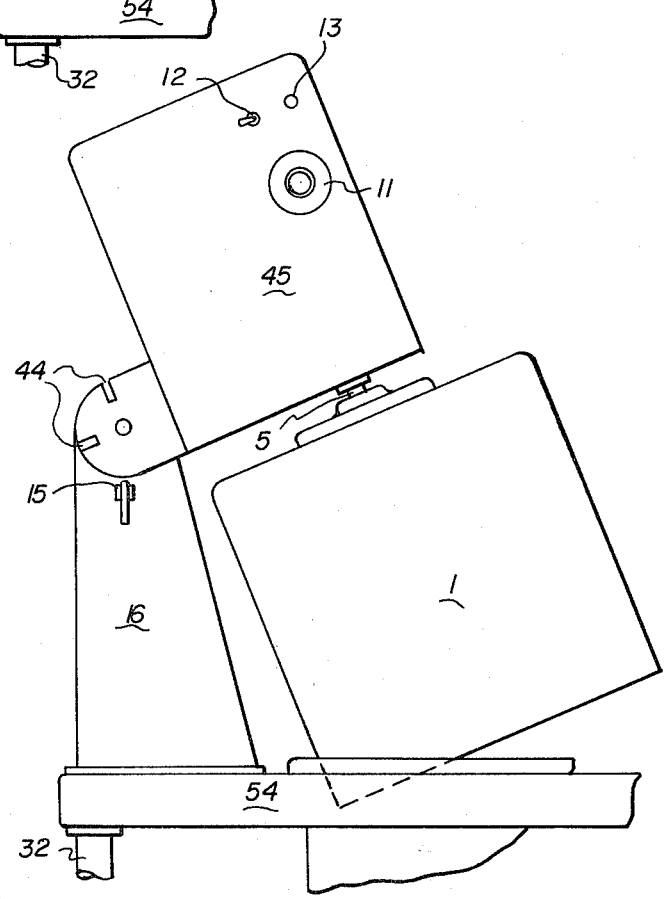

COMBINATION BREADER, MARINATOR AND PREPARATION UNIT

BACKGROUND OF THE INVENTION

In any large food dispensing facility, such as a restaurant, a hospital, a school, a prison and so forth, the sheer volume of foodstuffs prepared requires the use of specialized and heavy duty equipment. Many foodstuffs require extensive and varied preparation even before cooking. Likewise, many foods such as lamb, pork vegetables, etc., are marinated or soaked in a vinegar or soy solution or a salt brine or a special marinate solution to tenderize the food and enhance the flavor. Furthermore, almost all foodstuffs must be washed prior to preparation. This function is often accomplished by soaking the food in extremely hot water which not only cleanses the food but also begins the cooking process and reduces the total cooking time, thus saving time and energy.

These three processes alone, i.e. breading, marinating, and preparing, if done manually, piece by piece, would require such extensive labor costs that most of the aforementioned facilitates purchase machinery capable of processing large quantities of foodstuffs at a time. In the past accomplishing each of the three mentioned tasks usually required three separate machines, a breader, a marinator, and a prep unit. The present invention is capable of accomplishing all three of these tasks in a single apparatus.

The following references were uncovered during our search and appear to be germane to the patentability of the present invention:
U.S. Pat. No. 2,801,545, Schottle
U.S. Pat. No. 3,068,912, Shaw
U.S. Pat. No. 3,334,575, Erwin
U.S. Pat. No. 3,696,778, Moore
U.S. Pat. No. 3,928,634, Gasbarro
U.S. Pat. No. 3,739,743, McKee
U.S. Pat. No. 3,855,965, Gordon
U.S. Pat. No. 3,955,529, Reed
U.S. Pat. No. 4,023,521, Booth None of the references cited here combines the functions of breading, marinating, and preparing in a single, mobile apparatus. Likewise, the structure of the cited references are substantially different from that employed in the present device. Furthermore, no reference was found that utilizes the unique rippled contour of the sifter to cull out the undesirable clumps of breading that often forms during the breading operation and other large objects which otherwise may contaminate the flour.

SUMMARY AND OBJECTS OF THE INVENTION

Accordingly, it is a primary object of the present invention to provide the capability to perform three of the most common food preparation tasks—breading, marinating, preparing—with a single apparatus. This is accomplished in the present invention by mounting a mixing drum on a service cart that adapts to receive a sequence of basins according to the requirements of the operation being performed.

It is also an object of the instant invention to make handling of large quantities of foodstuffs easier by providing an automatic timed mixing drum that tilts, a service cart on casters, and easily removed racks and basins to facilitate the moving and lifting of foodstuffs.

It is a further object of the present invention to provide means to separate the foodstuffs from the excess preparation materials such as breading and marinating solutions in a clean and simple manner. This is accomplished by downwardly tilting the mixing drum which directs the foodstuffs into a catch pan with a grated bottom which retains the foodstuffs while allowing the preparation material to pass through the grate into the catch basin below.

It is a further object of the present invention to provide means to process and reuse the excess breading material which accumulates in the catch basin underneath the catch pan. This is accomplished by a motor driven sifter located underneath the catch basin. Excess breading material exits through a portal in the bottom of the catch basin and is fed into the sifter. The unique design of the sifter bottom forces large clumps of breading dough balls to migrate to one end of the sifter where they are collected, while finer breading material sifts through apertures in the sifter trough and is collected for reuse.

Other objects and advantages will become apparent in the following specification when considered in light of the accompanying drawings.

BRIEF DESCRIPTION OF THE DRAWINGS

FIG. 3 is an end view of the mixing drum with the lid removed.

FIG. 4 is a side view of the mixing head with the drum in the upright position.

FIG. 5 is a side view of the mixing head with the drum in the discharge position.

FIG. 7 is a side cutaway view of the manually operated mixing drum.

DESCRIPTION OF THE PREFERRED EMBODIMENT

Figure 1:
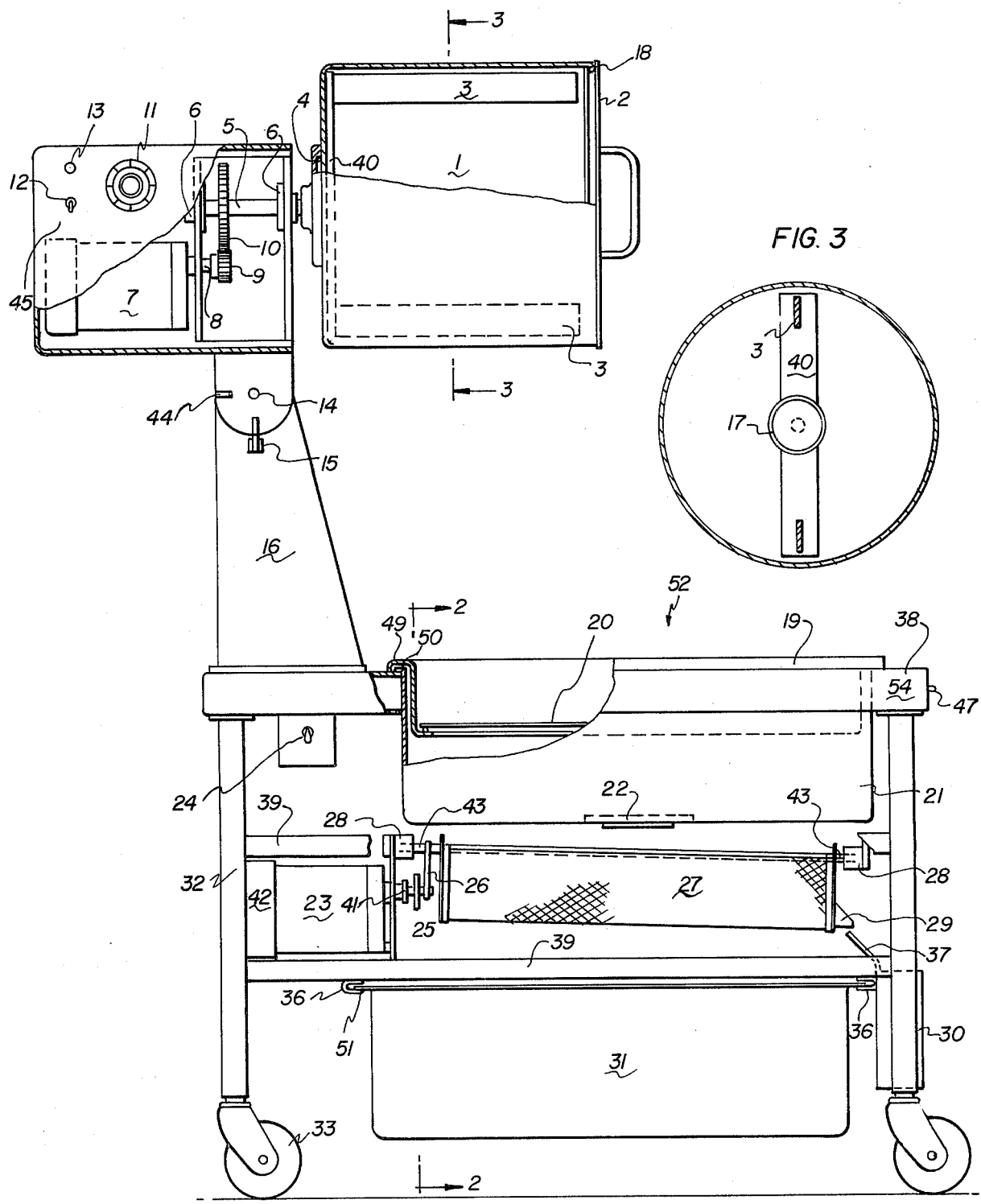
FIG. 1 is a sectional side view of the invention set up as a breader.

Referring now to the drawings in detail, wherein like reference characters indicate like parts throughout the several figures, the reference numeral 1 generally refers to the mixing drum which is a large open-ended cylindrical drum which is disposed on the open end with a lid 2 that covers the open end of the drum and is sealed by means of a perimetrically disposed seal 18. At the base of the drum is attached the agitator blade mounting member 40 which rotates with the drum and upon which the agitator blades 3 are mounted. The blades 3 are disposed so that they cause the product to tumble in the drum mixing foodstuffs contained therein with breading, marinating fluid or the like. The mounting member 40 is connected to a drive shaft 5 by means of a threaded lug 17, this allows for easy dis-assembly and cleaning of the mixing drum. The seal 4 seals the orifice at the rear of the drum which receives the drive shaft 5. Because the drive shaft 5 supports the mixing drum 1, it is disposed near either end with bearings 6. Affixed to the mixing drive shaft 5 is a gear 10 which meshes with another gear 9 that is affixed to the motor drive shaft 8. The motor 7 drives the motor drive shaft 8 which in turn propels the gears 9 and 10, consequently driving the drum and agitator blades 3. The motor and gear head are covered with a shroud 45 upon which there is a pilot light 13, an on-off switch 12, and a timer 11. The entire mixing unit including the mixing drum, the gear head cluster and the drive motor are pivotally connected to the mixing unit support arm 16 by an axle 14 which allows the mixing unit to be tilted upward or downward as shown in FIGS. 4 and 5

In the alternative, the drum and blades can be driven manually by a hand crank as shown in FIG. 7, where the reference letter H indicates the hand crank. In this embodiment the drum and the pivoting support arm 16 can be clamped to any service table or counter top as well as the service cart 54.

Figure 2:
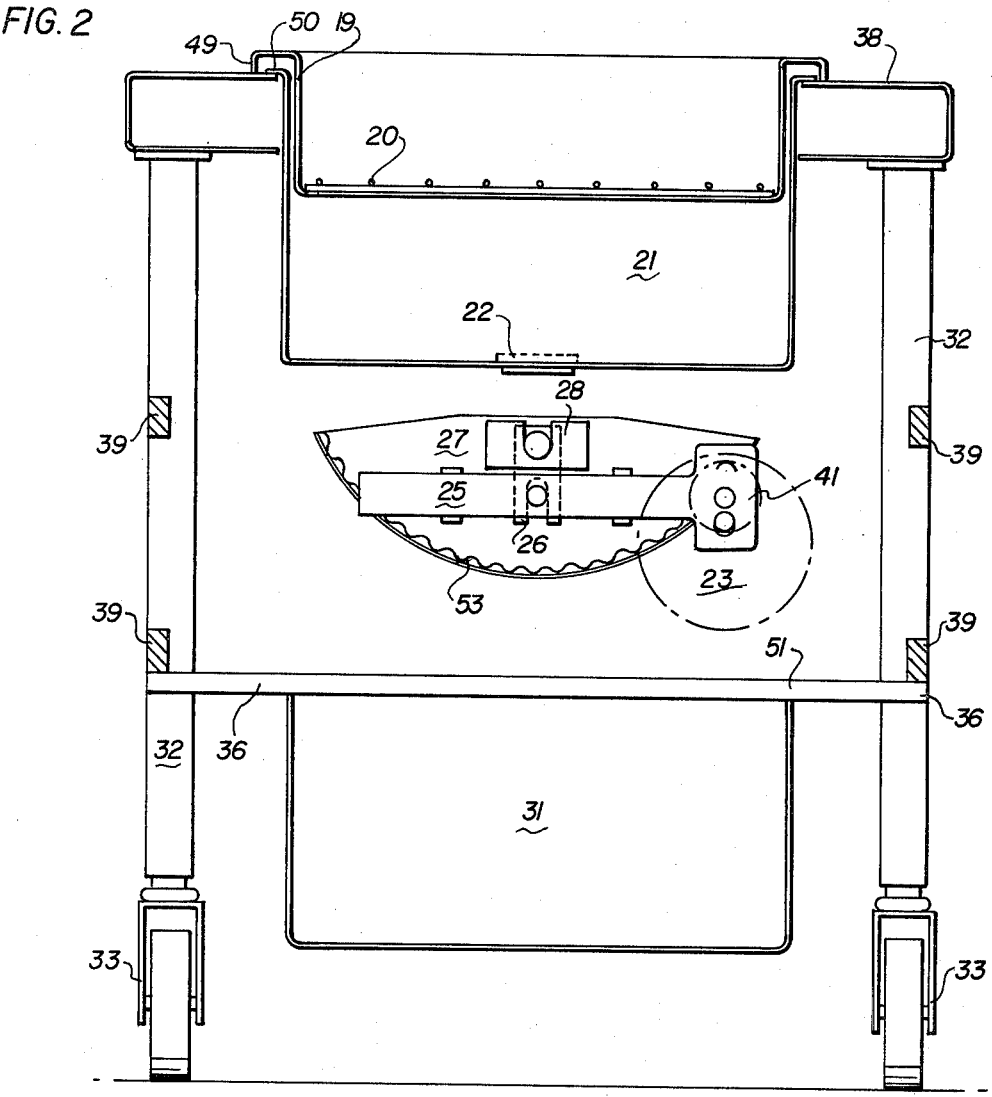
FIG. 2 is a sectional end view of the invention excluding the mixing head.

The upper portion of the support arm 16 near the axle 14 is provided with a pivoting lock tab 15 and positioning slot 44 so that the mixing unit can be locked in the desired position. The lower portion of the support arm 16 is structurally connected to one side of the service cart 54 (FIG. 2).

The service cart 54 is comprised of a plurality of vertical leg members 32 and a plurality of horizontal cross members 39. A caster 33 is provided at the bottom of each vertical member 32 to allow the entire apparatus mobility. The uppermost horizontal surface 38 of the service cart 54 has a central opening 52 therethrough. The opening 52 is positioned so that when the mixing drum is tilted downwardly the opening in the drum registers with the opening in the cart so that the contents of the drum will be directed towards the opening in the cart.

Both the foodstuff receiving pan 19 and the catch basin 21 are supported in the opening 52 by means of their respective rims 49 and 50. The bottom of the receiving pan 19 is provided with grate 20 which retains the foodstuffs in the receiving pan 19 and allows the excess breading or like material to fall through the grate 20 and be caught in the catch basin 21. The bottom of the catch basin 21 is provided with an exit portal 22 which allows the breading material to pass into the sifter trough 27 mounted beneath the catch basin 21. The sifter trough 27 is an elongated U-shaped trough provided with axles 43 on either end pivotally mounted in support brackets 28 such that the entire trough is not horizontal but is inclined in the direction of the exit chute 29 provided in one end of the sifter trough. The bottom of the trough is a curved grate provided with apertures and contoured undulating ripples 53 so that when the trough is agitated the finer particles of the breading pass through the apertures while clumps of breading dough balls migrate towards the exit chute 29 in the end of the trough. The clumps are driven towards the exit chute 29 because of the inclination of the sifter trough and the unique contour of the ripples 53 which cause the migration of the breading clumps.

The breading clump dough balls container 30 is mounted in the cart beneath the exit chute of the sifter 29 such that migrating clumps driven from the sifter are directed into the container 30 by the container entrance chute 37. Disposed directly beneath the sifter 27 is the sifter catch pan 31. The rim 51 of the catch pan 31 slides on tracts 36 mounted on the horizontal member 39 of the service cart. The track 36 allows easy access to the catch pan 31 containing the sifted reuseable breading material.

The oscillation of the sifter is created by a drive motor 23 mounted to the cart by a bracket 42 and controlled by an on-off switch 24. The drive motor 23 drives a disc 41 provided along the perimeter with a peg so that it acts like a cam. The peg on the disc 41 drives the shuttle bar 25 also provided with a peg. The peg on the shuttle bar 25 is captured in a slotted drive receptacle 26 attached to the axle 43 of the sifter 27. Therefore, the motor creates a rocking motion in the sifter which agitates its contents.

Figure 6:
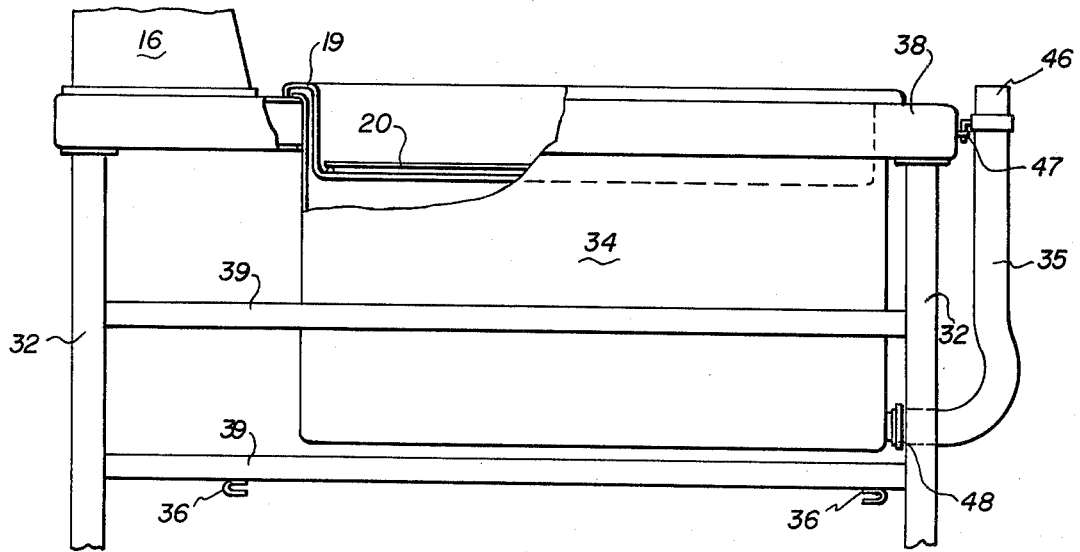
FIG. 6 is a side view, partially sectional, of the service cart set up with the fluid catch basin for marinating or use as a prep unit.

The preferred embodiment described above represents one of three modes of operation of the present invention. As well as a breader the device can be used as a marinator or a prep unit. By removing the catch pan 21, the sifter trough 27, and the sifter catch pan 31, and installing the liquid catch basin 34, the unit converts from a breader to a marinator or prep unit. The liquid catch basin 34 (FIG. 6) is installed in the opening 52 in the service cart 54 in exactly the same manner that the previous catch pan 21 was installed. Similarly, the same upper catch pan with the grate 19 is used in this mode of operation. The liquid catch basin 34 is provided with a circular threaded drain plug 48 located at the bottom of the outside vertical face of the catch basin. Attached to the drain plug 48 is the drain hose 35 provided with a collar 46 containing a hook which mounts to a mounting tab 47 located along the side of the upper surface 38 of the service cart 54. Thus the mouth of the hose is mounted above the level of the liquid contained in the catch basin 34. However, when draining the liquid from the catch basin the mouth of the hose is disconnected from the mounting tab 47 and lowered below the level of the fluid contained within the basin in order to discharge said fluid.

The modus operandi is very similar for the various functions performed by the present invention, therefore, conversion from one mode of operation to another is simple and efficient.

It should also be understood that this invention may be so modified to suit very small stores. By being constructed small enough and without upright supports to sit on top of a work table, the mixing drum, agitator and sifter will be hand operated without motors, with or without a mechanically operated timer.

Having thus described the preferred embodiment of the invention it should be understood that numerous structural modifications and adaptations may be resorted to without departing from the spirit of the invention.

What is claimed is:

1. A combination breader, marinator and preparation device for foodstuffs and the like, the device comprising: drum means for receiving and mixing foodstuffs therein, support means pivotally carrying said drum means, and cart means underlying said drum means and at one end thereof carrying said support means and provided with treating means, said treating means including an inclined sifter having an opening in its lower end and which is to receive at least part of the foodstuffs from said drum means, said sifter having apertures therein to allow particulate food stuff material to pass and undulations thereon to retard passing of the particulate material toward said opening in its lower end while allowing passing of large objects toward said opening in its lower end, whereby foodstuffs disposed within said drum means are altered in form and thereafter are placed within said treating means to dissociate various components of the foodstuffs by pivoting said drum means about said support means and subjecting the foodstuffs to action of said sifter.

2. The device of claim 1 wherein said drum means comprises: a mixing drum having internal agitator blades placed approximate to internal walls of said mixing drum, a shaft connected tro rotate said blades extending out from and supporting said mixing drum and powered by motor means disposed within a shroud adjacent said mixing drum, and a downwardly extending support head fastened to said shroud for pivotal connection with said support means.

3. The device of claim 2 wherein said motor means is a hand crank connected to said shaft and said drum means along with said support means can be clamped to said cart means or, in the alternative, can be clamped to a service table or counter top.

4. The device of claim 2 wherein aid mixing drum has an opening remote from said shaft and said cart means comprises: a plurality of vertical leg members which carry thereon a horizontal service table that has a central opening therethrough and, under said central opening, said treating means are disposed with respect to said mixing drum so that said mixing drum has said opening remote from said shaft registered with said central opening of said service table when pivoted with respect rthereto.

5. The device of claim 4 wherein said treating means comprises: a first foodstuff receiving pan nested within said opening of said service table and having a bottom surface defining a grate which separates foodstuffs of different dimensions, a second pan surrounding said first pan and having an opening port in its bottom face to pass therethrough separated foodstuffs, said sifter underlying said port to further separate the foodstuffs, and an underlying catch pan.

6. The device of claim 5 wherein said sifter comprises: plural horizontal members extending between said legs to support said sifter, said sifter being defined by an elongate trough of substantially "U" shaped cross section inclinded from horizontal and having a closed upper end and an open lower end, an axle from which said sifter depends carried in brackets at opposed extremities thereof and which hang from said horizontal members, and a sifter drive motor for vibrating said sifter operatively connected thereto.

7. The device of claim 6 wherein said sifter further comprises an exit chute disposed at said lower end, an arcuate sifter plate having a curvature complimental to said U-shaped trough disposed along a bottom surface thereof formed with an undulating apertured ripple contour to aid in separating foodstuffs formed as balls and similar objects which pass down said sifter rather than through said apertures, and food stuff ball container having an entrance chute oriented to receive balls from said exit chute.

8. The device of claim 7 in which said support means comprises an upwardly extending arm fastened to said support head, said support head having plural notches disposed along an outer perimeter thereof and said arm has a pivoted locking tab adapted for registry within a notch to lock said mixing device in one position.

9. The device of claim 7 in which said mixer motor means is connected to said shaft through a pair of meshed gears, one on said motor, one on said shaft, and said sifter motor includes a shaft from said motor, a disc thereon having a pin element along an outer face edge thereof connected to a shuttle bar fastened to said sifter to oscillate said sifter.

10. The device of claim 1 wherein said treating means are removable, the device being modular in construction.

* * * * *